United States Patent [19]

Maruyama

[11] Patent Number: 5,221,146
[45] Date of Patent: Jun. 22, 1993

[54] STRUCTURE OF BEARING OF GEARED SHAFT

[75] Inventor: Noboru Maruyama, Yokohama, Japan

[73] Assignee: Nissan Motor Co., Ltd., Yokohama, Japan

[21] Appl. No.: 867,740

[22] Filed: Apr. 13, 1992

[30] Foreign Application Priority Data

Apr. 16, 1991 [JP] Japan ................................. 3-82742

[51] Int. Cl.$^5$ ............................................. F16C 25/06
[52] U.S. Cl. ................................... 384/447; 384/448; 384/519
[58] Field of Search ................. 384/447, 448, 99, 519, 384/583, 617

[56] References Cited

U.S. PATENT DOCUMENTS

1,479,313  1/1924  Pallavicini ........................ 384/447
5,029,118  7/1991  Nakajima et al. .
5,060,760 10/1991  Long et al. ........................ 384/448

FOREIGN PATENT DOCUMENTS

62-188854  8/1987  Japan .

OTHER PUBLICATIONS

"Gear of a Designer" by Hirasawa, Rikogaku Sha, (1970) 302.

Primary Examiner—Lenard A. Footland
Attorney, Agent, or Firm—Lowe, Price, LeBlanc & Becker

[57] ABSTRACT

A structure of bearing journaling a geared shaft is disclosed in which a piezoelectric sensor is installed in a space between an outer ring of the bearing and its casing for detecting at least one of a force applied to the bearing and generated due to a mesh of gears, its acceleration, velocity, or displacement and outputting a detection signal according to a result of detection of the force and a piezoelectric actuator installed in the bearing so as to be in series with the piezoelectric element sensor or so as to be axially symmetrical to the opposing piezoelectric element sensor for providing an expansion and constriction movement according to a drive signal, the driving signal being based on the detection signal and having a phase opposite to the phase of the force detected by the piezoelectric element sensor.

11 Claims, 4 Drawing Sheets

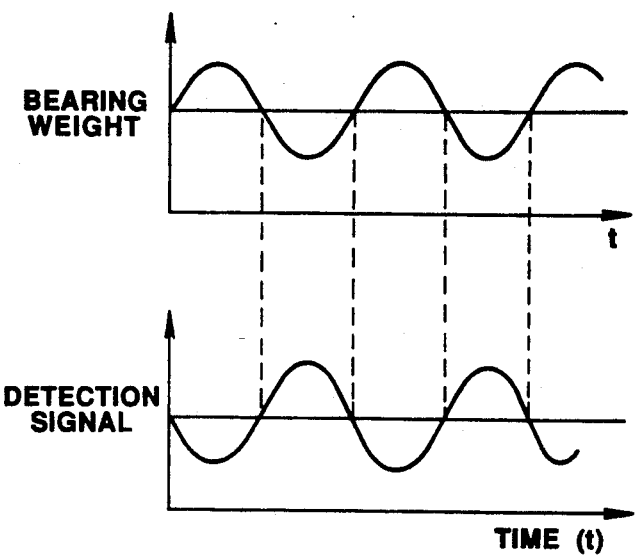
FIG. 2(A)
FIG. 2(B)
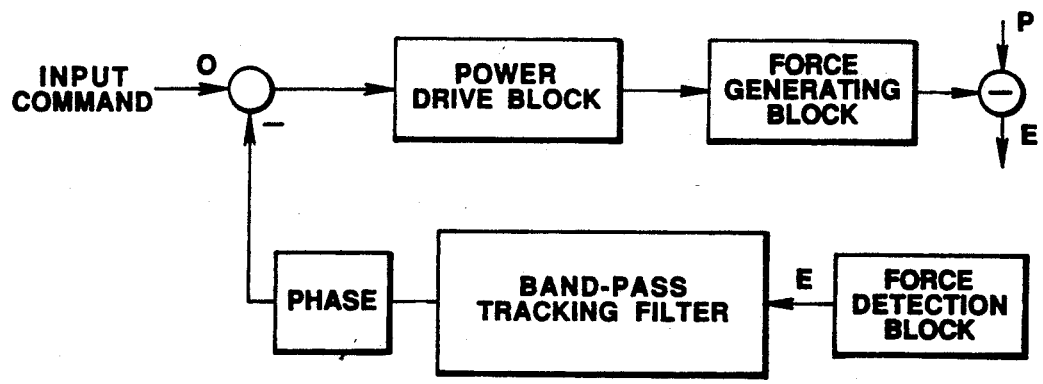
FIG. 3

FIG. 7(A) BEARING WEIGHT

FIG. 7(B) DRIVE SIGNAL

FIG. 7(C) DETECTION SIGNAL

FIG. 7(D) FORCE APPIED TO CASING

TIME (t)

STRUCTURE OF BEARING OF GEARED SHAFT

BACKGROUND OF THE INVENTION (1) Field of the Invention

The present invention relates generally to a structure of bearing of a geared shaft.

(2) Description of the background art

A Japanese Patent Application First Publication No. Showa 62-188854 published on Aug. 18, 1987 exemplifies a previously proposed structure of a bearing of a geared shaft.

In the disclosed Japanese Patent Application First Publication, a geared shaft is rotatably supported on a casing via a bearing and an anti-vibration member is interposed between an outer ring of the bearing and the casing. The anti-vibration member is made of a casting material so that a vibration generated due to a meshing of gears with each other is damped through the anti-vibration member.

However, since the anti-vibration member is disposed between the bearing and casing, a transmission of the vibration due to the meshing may be damped to some degree and the transmission thereof itself cannot inherently be eliminated.

SUMMARY OF THE INVENTION

It is therefore an object of the present invention to provide a structure of a bearing of a geared shaft which can actively eliminate a transmission of vibration itself by absorbing the transmission thereof through an expansion and constriction of an actuator.

The above-described objects can be achieved by providing a structure of a bearing of a geared shaft, comprising: a) a bearing having a casing; an inner ring linked to the geared shaft; an outer ring interposed between the inner ring and the casing; b) detecting means for detecting at least one of a force applied to the bearing in a predetermined direction, its acceleration, velocity, or displacement in a mid way through which the detecting means is installed, the force being generated due to a transmission of a vibration from the geared portion of the shaft to the bearing at which its gears are meshed with other gears and for outputting a signal according to a result of detection of at least one of the force, acceleration, velocity or displacement; c) an actuator, responsive to a drive signal supplied thereto, for spontaneously expanding or constricting in the predetermined direction according to the drive signal; and d) driving means interposed between the detecting means and the actuator for providing the drive signal for the actuator, the drive signal being provided on the basis of the detection signal of the detecting means so that the expansion and constriction of the actuator serve to absorb the vibration due to the meshing of the gears.

The above-described objects can also be achieved by providing a structure of a bearing of a geared shaft, comprising: a) a bearing having a casing; an inner ring linked to the geared shaft; an outer ring interposed between the inner ring and the casing; b) detecting means for detecting a force applied to the bearing toward a radial direction of the bearing and generated due to an engagement of any one of gears of the geared shaft with another of gears and outputting a detection signal according to the result of detection of the force; c) an actuator, responsive to a drive signal supplied thereto, for providing a counteractive force so as to cancel the force according to the drive signal; and d) driving means interposed between the detecting means and the actuator for providing the drive signal for the actuator, the drive signal being provided on the basis of the detection signal of the detecting means so that the counteractive force exerted by the actuator cancels the force applied to the bearing.

BRIEF DESCRIPTION OF THE DRAWINGS

FIGS. 2(A) and 2(B) are signal timing charts for explaining a relationship between a bearing weight and a detection signal in the preferred embodiment shown in FIG. 1.

FIG. 3 is a control system block diagram for the structure of the bearing in the case shown in FIG. 1.

FIGS. 7(A) through 7(D) are signal timing charts for explaining relationships of bearing weight, drive signal, detection signal, and a force applied to a casing in the case shown in FIG. 5.

DETAILED DESCRIPTION OF THE PREFERRED EMBODIMENTS

Reference will hereinafter be made to the drawings in order to facilitate a better understanding of the present invention.

FIGS. 1 through 4 show a preferred embodiment of a structure of a bearing of a geared shaft according to the present invention.

Figure 1:
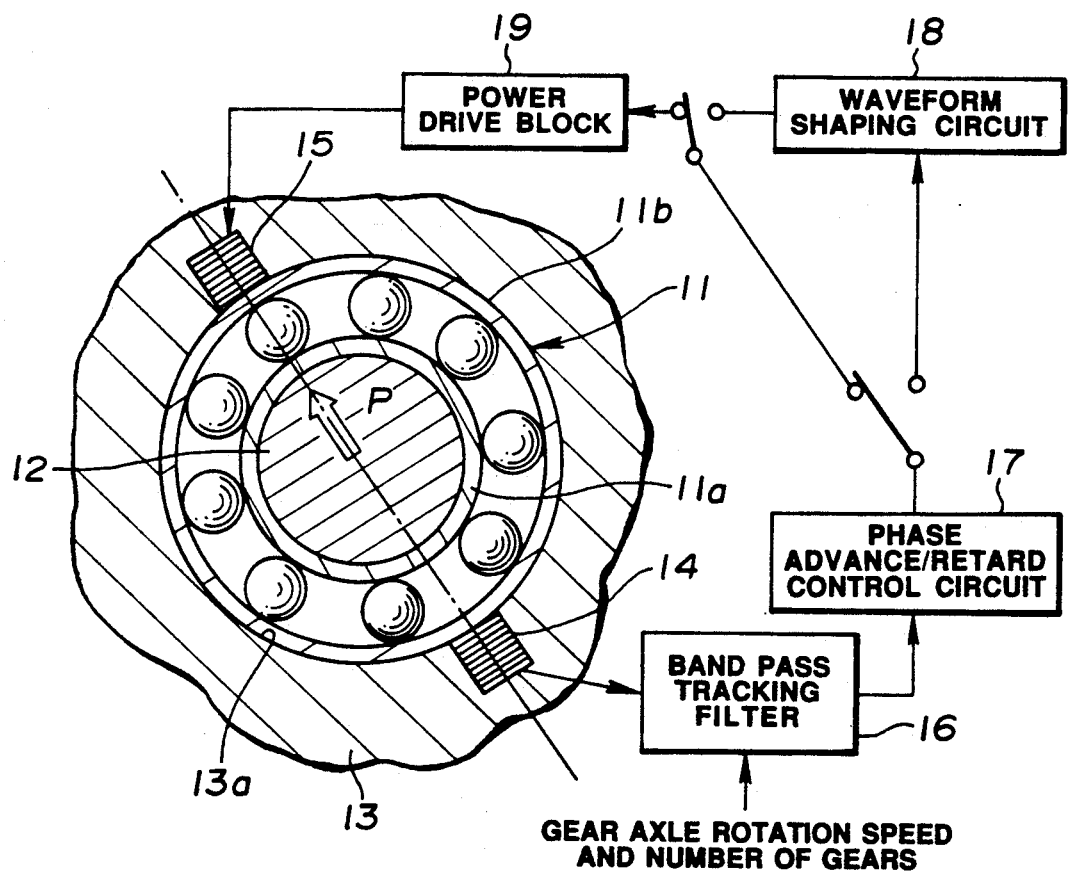
FIG. 1 is an explanatory view of a structure of a bearing of a geared shaft in a preferred embodiment according to the present invention.

In FIG. 1, a (radial) bearing 11 includes an inner ring (race) 11a linked to a rotatable shaft 12 and an outer ring (race) 11b linked to a casing 13 (in addition to balls). In details, the geared shaft 12 is pressurized and inserted into a bearing hole 13a. A bearing weight P is applied to the bearing 11 from the geared shaft 12. The bearing weight P is calculated on a basis of a gear span, etc., a method of calculation being exemplified by a Japanese Literature titled "Gear of a Designer" published on 1970 from a Rikogaku Sha, page 302, by Jiro Hirasawa.

The direction of the bearing weight P coincides with a direction of a vibration generated due to a meshing of gears in the geared shaft 12.

In FIG. 1, a piezoelectric element sensor 14 made of a piezoelectric element. One end of the piezoelectric element sensor 14 is contacted with the outer ring 11b of the bearing 11 and the other end thereof is contacted with the casing 13. The piezoelectric element sensor 14 serves to detect a force and direction of the bearing weight P.

It is noted the piezoelectric element sensor 14 may be replaced with a sensor which detects at least one of acceleration, velocity, and displacement in a predetermined direction generated on the bearing due to the meshing vibration of gears.

On the other hand, referring to FIG. 1, a piezoelectric actuator 15 constituted by a piezoelectric element is disposed axially symmetrical with respect to the piezoelectric element sensor 14 with the geared shaft 12 as an axial center. The piezoelectric actuator 15 expands and constricts toward the direction of the bearing weight P according to a derive signal supplied thereto.

One end of the piezoelectric actuator 15 is contacted with the outer ring 11b of the bearing 11 in its expansion-and-constriction direction and the other end thereof is contacted with the casing 13. The piezoelectric element sensor and actuator 14, 15 are pressurized and inserted into a space between the bearing 11 and casing 13.

It is noted that each of the piezoelectric element sensor and actuator may alternatively be constituted by an electrostrictive element.

Referring to FIG. 1, 16 denotes a band-pass tracking filter, 17 denotes a phase advance/retard control circuit, 18 denotes a waveform shaping circuit, and 19 denotes a power drive block.

These circuits serve to generate the drive signal to supply the drive signal to the piezoelectric actuator 15 on the basis of the result of detection by means of the piezoelectric element sensor 14 so as to absorb the meshing vibration energy according to the expansion and constriction of the piezoelectric actuator 15.

The detection signal from the piezoelectric element sensor 14 is passed through the band-pass tracking filter 16, phase advance/retard control circuit 17, waveform shaping circuit 18, and power drive circuit 19 (the waveform shaping circuit may be excluded) to form the drive signal supplied to the piezoelectric actuator 15.

The band-pass tracking filter 16 serves to calculate a meshing frequency according to a number of revolutions of the geared shaft 12 per time and the number of gears and assume the calculated frequency as a center frequency.

An action of the preferred embodiment will be described below.

As shown in FIG. 2(A), the bearing weight P due to the meshing vibration of gears is varied with time and, as shown in FIG. 2(B), the detection signal of the piezoelectric element sensor 14 is varied according to its variation in the bearing weight P.

Hence, the detection signal of the piezoelectric element sensor 14 is formed as a signal whose phase is reversed to a phase of the bearing weight P. When the detection signal is supplied to the piezoelectric actuator 15 as the drive signal, a force generated by the piezoelectric actuator 15 is varied such that its phase is reversed (180° opposite) to the phase of the bearing weight P. Hence, the piezoelectric actuator 16 can be expanded or constricted so that the phase of the detection signal becomes zero.

Suppose that the detection signal of the piezoelectric element sensor 14 is E and a circuit block diagram in the preferred embodiment is shown in FIG. 3.

As described above, since in the preferred embodiment the meshing vibration of the gears to be transmitted to the casing 13 can be absorbed through the piezoelectric actuator 15, the vibration itself to be transmitted can be eliminated. In addition, when the detection signal is passed through the waveform shaping circuit 18. the vibration transmission for a single frequency can assuredly be prevented. Furthermore, since the phase advance/retard control circuit 17 is provided, the assured prevention of the vibration transmission can be achieved even in a case where a distorted vibration waveform is present or a slight time difference between the piezoelectric element sensor 14 and piezoelectric actuator 15 is present.

It is noted that since the meshing vibration has a plurality of integral number of harmonic wave frequency components with respect to a first-order vibrating signal, the pass band of frequency of the band-pass tracking filter may be set to a higher frequency side.

In addition, the pair of the piezoelectric element sensor 14 and piezoelectric actuator 15 installed in the bearing 11 may also be installed in another bearing for the same geared shaft.

Figure 4:
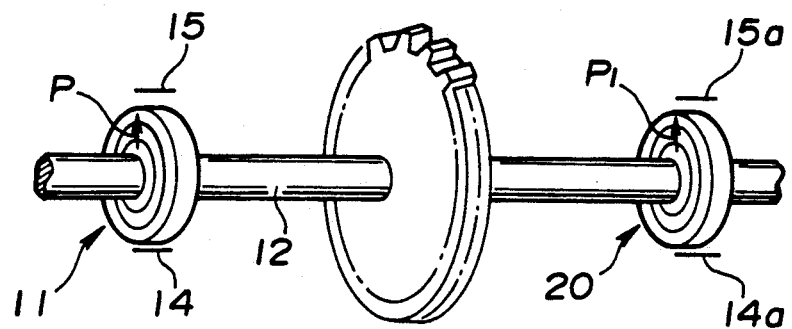
FIG. 4 is a schematic perspective view of the structure of the bearing in a modification of the preferred embodiment according to the present invention when applicable to two journalled parts.

FIG. 4 shows an example of the structure of the bearing in which the pair of sensor and actuator 14, 15 are installed in the other bearing 20 as well as the pair of sensor and actuator 14, 15 installed in the bearing 11.

In FIG. 4, in a case where the bearing weight P is large and only the transmission of the vibration concerned with the bearing weight P is interrupted, the piezoelectric actuator 15a may be used as a force detecting element.

Furthermore, since the piezoelectric element sensor 14 is used to detect the signal having the phase opposite to the bearing weight P, a sound pressure waveform of a gear noise or vibrating waveform of the gear meshing operation in a route of transmission may be used.

The structure of the phase advance/retard control circuit is exemplified by an A/D converter, D/A converter, a microprocessor, digital filter and an adaptive noise canceling filter disclosed in a U.S. Pat. No. 5,029,118 issued on Jul. 2, 1991 or in a U.S. patent application Ser. No. 07/629,118, the disclosure of which is herein incorporated by reference.

It is noted that the phase advance/retard control circuit may be constituted by an analog phase shifter with fixed gain shifting the input signal passed through the tracking filter according to inherent responsive characteristics of the piezoelectric elements.

FIGS. 5 through 7(D) show another preferred embodiment of the structure of the bearing of the geared shaft according to the present invention.

Figure 5:
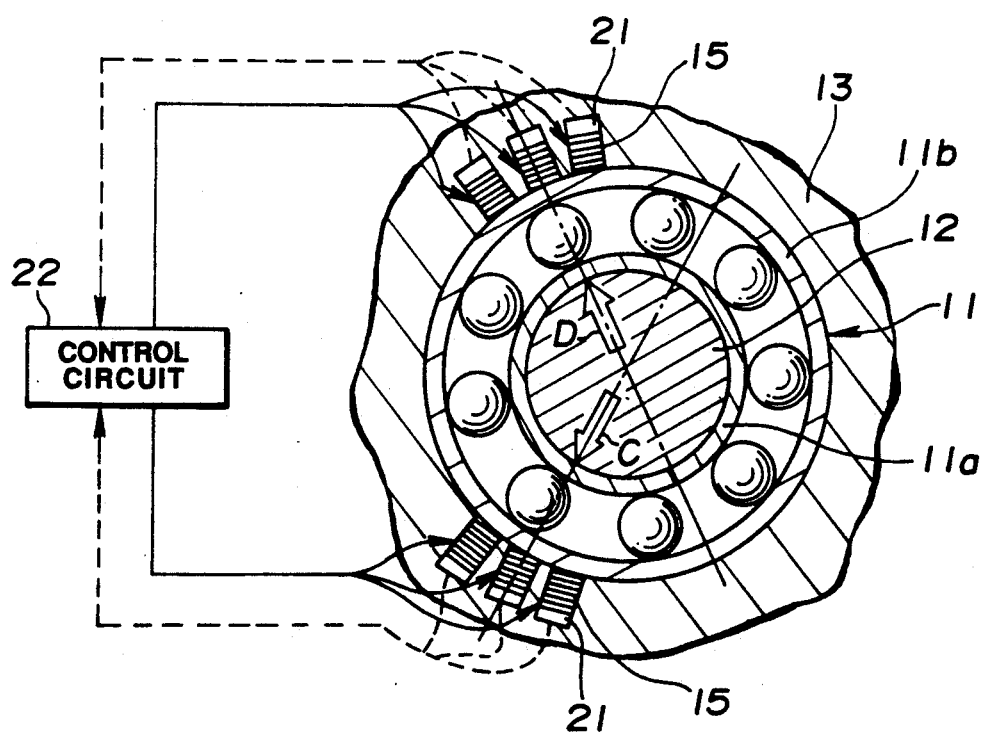
FIG. 5 is a schematic overall view of the structure of the bearing in another preferred embodiment according to the present invention.
Figure 6:
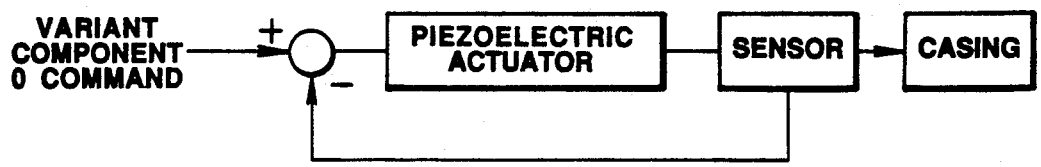
FIG. 6 is a control system block diagram for the structure of the bearing in the other preferred embodiment shown in FIG. 5.
Figure 6:
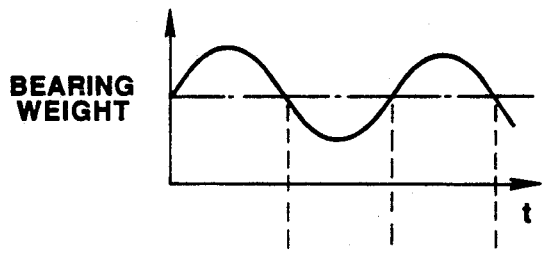
Figure 6:
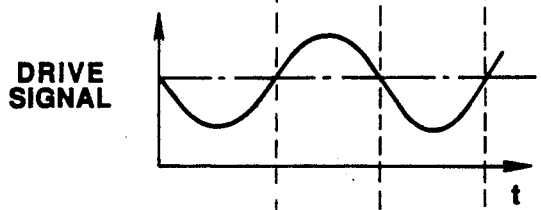
Figure 6:
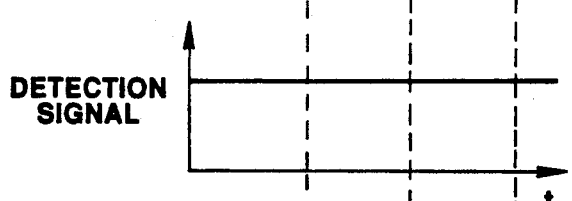
Figure 6:
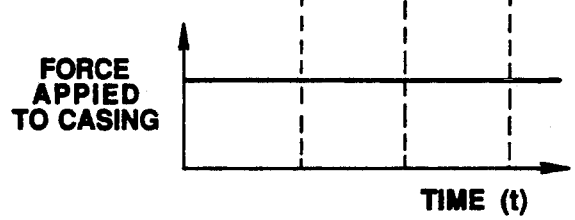

It is noted that the same elements in FIGS. 1 and 5 are designated by like reference numerals and the explanations of the same elements as those shown in FIG. 1 are omitted here.

In FIG. 5, numeral 21 denotes the piezoelectric element sensors which are interposed between the piezoelectric actuator 15 and the casing 13 so as to detect a force in a direction of the action of the bearing weight generated on the bearing 11 due to the meshing vibration via the piezoelectric actuators 15.

The three pairs of the piezoelectric element sensors 21 and piezoelectric actuators 15 are arranged respectively in a first direction D of the bearing weight during a drive load and in a second direction C during a coast load. Since the direction of action of the bearing weight is different in the cases of the drive load and coast load, the directions C and D are mutually different.

The detection signals derived from the respective piezoelectric element sensors 21 are supplied to the corresponding piezoelectric actuators 15 via a control circuit 22. The control circuit 22 serves to carry out a feedback control so that the detection signals therefrom become zeros, the structure of the control circuit 22 being shown in FIG. 6.

In details, when one of the piezoelectric element sensor 21 is vibrated via the corresponding piezoelectric actuator 15 due to the bearing weight D or C as shown in FIG. 7(A), the piezoelectric actuator 15 is expanded or constricted in a phase shown in FIG. 7(B) through the feedback control of control circuit 22 so that variations in the detection signal of the piezoelectric element sensor 21 become substantially zero as shown in FIG. 7(C) and variations in the force applied to the casing 13 become substantially zero as appreciated from FIG. 7(D).

A direct-current component shown in FIG. 7(C) may be interrupted by means of a high-pass filter installed in the control circuit 22.

Since, in the other preferred embodiment, each piezoelectric element sensor 21 is interposed between the piezoelectric actuator 15 and the casing 13, each couple of the piezoelectric actuator and element sensor may be installed at an arbitrary position on an outer peripheral end of the bearing 11 so that the vibration of the bearing weight in every direction can be prevented.

Hence, as in the case of the other preferred embodiment, both transmissions of vibrations in the direction of the bearing weight during the drive load and coast load can easily be applied.

In addition, in a case of a manual transmission, the direction of action on the bearing weight is varied when, e.g., positions of the gears at which the gears are meshed mutually are different in the axial direction or the number of gears by which the gears are meshed in a single geared shaft. In such a case as described above, the control circuit carried out an independent control for each couple of the piezoelectric element sensors and actuators so that the present preferred embodiment is easily applicable. If the direct-current components of the piezoelectric actuators 15 are arbitrarily varied, the input of the force to the casing 13 can be zeroed and a static bending strength can be relieved. Furthermore, a reduction of weight of the bearing 11 can be realized.

A defected contact of each gear can be prevented when the center position of the geared shaft is moved. It is noted that the detection of the vibration by means of the piezoelectric element sensors can be assured even if they are inserted into the space between the casing and outer ring of the bearing without pressure.

As described hereinabove, since the expansion and constriction of the actuator is controlled on the basis of the result of detection by means of the sensor so that, e.g., the detection result indicates zero, the meshing vibration of the gears can be absorbed due to the expansion and constriction of the actuator and the transmission of vibration itself be eliminated.

Furthermore, various effects described above can be exhibited by the structure of bearing of the geared shaft according to the present invention.

It will fully be appreciated by those skilled in the art that the foregoing description has been made to the preferred embodiments and various changes and modifications may be made without departing from the scope of the present invention which is to be defined by the appended claims.

What is claimed is:

1. A structure of a bearing of a geared shaft, comprising:
   a) a bearing having a casing; an inner ring linked to the geared shaft; an outer ring interposed between the inner ring and the casing;
   b) detecting means for detecting at least one of a force applied to the bearing in a predetermined direction, its acceleration, velocity, or displacement in a mid way through which the detecting means is installed, the force being generated due to a transmission of a vibration from the geared portion of the shaft to the bearing at which its gears are meshed with other gears and for outputting a signal according to a result of detection of at least one of the force, acceleration, velocity or displacement;
   c) an actuator, responsive to a drive signal supplied thereto, for spontaneously expanding or constricting in the predetermined direction according to the drive signal; and
   d) driving means interposed between the detecting means and the actuator for providing the drive signal for the actuator, the drive signal being provided on the basis of the detection signal of the detecting means so that the expansion and constriction of the actuator serve to absorb the vibration due to the meshing of the gears.

2. A structure of a bearing of a geared shaft as set forth in claim 1, wherein said detecting means comprises a piezoelectric element sensor installed in a space between the outer ring and casing so as to have an axially symmetrical with respect to the actuator with the geared shaft as a center, the piezoelectric element sensor outputting an electrical signal having a phase opposite to that of a bearing weight in the predetremined direction.

3. A structure of a bearing of a geared shaft as set forth in claim 2, wherein said actuator comprises a piezoelectric actuator installed in a space between the outer ring and casing.

4. A structure of a bearing of a geared shaft as set forth in claim 3, wherein said driving means includes: a band-pass tracking filter which calculates a frequency of the gears at which the gears are meshed to be passed therethrough according to the number of gears of the geared shaft and number of rotations of the geared shaft per time; a phase advance/retard control circuit which adjusts the phase of the detection signal having the frequency passed through the tracking filter; and a power drive block which drives the actuator to expand and constrict at the frequency coincide with that of the detection signal but at the phase opposite to the phase of the detection signal.

5. A structure of a bearing of a geared shaft as set forth in claim 4, wherein said predetermined direction is the direction of the bearing weight in a radial direction of the bearing.

6. A structure of a bearing of a geared shaft as set forth in claim 5, wherein said detecting means and actuator are installed in another bearing journalling the same shaft.

7. A structure of a bearing of a geared shaft as set forth in claim 6, wherein said driving means further includes a waveform shaping circuit for shaping the waveform of the signal output from the phase advance/retard control circuit.

8. A structure of a bearing of a geared shaft as set forth in claim 1, wherein said detecting means is disposed in a space between the actuator and casing, the detecting means detecting at least one of a force applied to the bearing in a predetermined direction, its acceleration, velocity, or displacement in a mid way through which the detecting means is installed via said actuator, the force being generated due to a transmission of a vibration from the geared portion of the shaft to the bearing at which its gears are meshed with other gears and for outputting a signal according to a result of detection of at least one of the force, acceleration, velocity or displacement.

9. A structure of a bearing of a geared shaft as set forth in claim 8, wherein said detecting means comprises a plurality of piezoelectric element sensors installed installed between the outer ring and casing in series with the actuator, said actuator comprising the plurality of piezoelectric actuators whose number corresponds to the number of piezoelectric actuators, each of said piezoelectric actuators receiving the drive signal independently from said driving means according to the individual detection signals of the piezoelectric element sensors.

10. A structure of a bearing of a geared shaft as set forth in claim 1, wherein said detecting means comprises an electrostrictive element installed in a space between the outer ring and casing so as to have an axially symmetrical with respect to the actuator with the geared shaft as a center, the piezoelectric element sensor outputting an electrical signal having a phase opposite to that of a bearing weight in the predetermined direction.

11. A structure of a bearing of a geared shaft, comprising:
   a) a bearing having a casing; an inner ring linked to the geared shaft; an outer ring interposed between the inner ring and the casing;
   b) detecting means for detecting a force applied to the bearing toward a radial direction of the bearing and generated due to an engagement of any one of gears of the geared shaft with another of gears and outputting a detection signal according to the result of detection of the force;
   c) an actuator, responsive to a drive signal supplied thereto, for providing a counteractive force so as to cancel the force according to the drive signal; and
   d) driving means interposed between the detecting means and the actuator for providing the drive signal for the actuator, the drive signal being provided on the basis of the detection signal of the detecting means so that the counteractive force exerted by the actuator cancels the force applied to the bearing.

\* \* \* \* \*